US012043305B2

(12) United States Patent
Kishi et al.

(10) Patent No.: US 12,043,305 B2
(45) Date of Patent: Jul. 23, 2024

(54) STEERING ANGLE DETECTING APPARATUS

(71) Applicant: SUBARU CORPORATION, Tokyo (JP)

(72) Inventors: Ryosaku Kishi, Tokyo (JP); Pohsiu Tsai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 496 days.

(21) Appl. No.: 17/236,019

(22) Filed: Apr. 21, 2021

(65) Prior Publication Data

US 2021/0331743 A1    Oct. 28, 2021

(30) Foreign Application Priority Data

Apr. 24, 2020   (JP) .................................. 2020-077435

(51) Int. Cl.
*B62D 15/02* (2006.01)
*G01D 5/14* (2006.01)

(52) U.S. Cl.
CPC ..... *B62D 15/0215* (2013.01); *B62D 15/0245* (2013.01); *G01D 5/145* (2013.01)

(58) Field of Classification Search
CPC .......................... B62D 15/021; B62D 15/0215
See application file for complete search history.

(56) References Cited

U.S. PATENT DOCUMENTS

| 7,201,070 B2 * | 4/2007 | Tokumoto | ............... | G01L 3/104 |
| | | | | 73/862.328 |
| 10,933,907 B2 * | 3/2021 | Ohnishi | ................... | G01L 3/105 |

(Continued)

FOREIGN PATENT DOCUMENTS

| JP | 62-241771 A | 10/1987 |
| JP | 6-135348 A | 5/1994 |
| JP | 2006-322794 A | 11/2006 |
| JP | 2007-333658 A | 12/2007 |

(Continued)

OTHER PUBLICATIONS

Notification of Reasons for Refusal issued in Japanese Patent Application No. 2020-077435 dated Aug. 15, 2023, with machine translation.
Notice of Reasons for Refusal issued in Japanese Patent Application No. 2020-077435 dated Dec. 5, 2023, with machine translation.

*Primary Examiner* — Long T Tran
(74) *Attorney, Agent, or Firm* — TROUTMAN PEPPER HAMILTON SANDERS LLP (57) ABSTRACT

A steering angle detecting apparatus includes a steering angle sensor and a diagnostic unit. The steering angle sensor includes two relative steering angle detectors and an absolute steering angle processor. The two relative steering angle detectors detect a plurality of two relative steering angles. The absolute steering angle processor calculates absolute steering angles. The diagnostic unit determines whether an angular signal indicating an absolute steering angle of the absolute steering angles is outputted from the absolute steering angle processor. The diagnostic unit stores a latest absolute steering angle, determines which of the two relative steering angle detectors outputs one of the two relative steering angles, and, where one of the two relative steering angle detectors is determined as outputting the one of the two relative steering angles, update the latest absolute steering angle by adding outputted one of the two relative steering angles to the stored latest absolute steering angle.

4 Claims, 4 Drawing Sheets

(56) References Cited

U.S. PATENT DOCUMENTS

| | | | |
|---|---|---|---|
| 2011/0080160 A1* | 4/2011 | Tomita | B62D 5/049 |
| | | | 324/76.77 |
| 2013/0035896 A1* | 2/2013 | Ueda | G01D 5/2451 |
| | | | 702/151 |
| 2014/0208890 A1* | 7/2014 | Takayanagi | B62D 15/0245 |
| | | | 74/552 |
| 2018/0037254 A1* | 2/2018 | Izutani | B62D 5/0487 |
| 2018/0154926 A1* | 6/2018 | Ohira | B62D 15/02 |
| 2019/0193776 A1 | 6/2019 | Tsubaki et al. | |

FOREIGN PATENT DOCUMENTS

| | | |
|---|---|---|
| JP | 2014-15153 A | 1/2014 |
| WO | 2018/038110 A1 | 3/2018 |

\* cited by examiner

STEERING ANGLE DETECTING APPARATUS

CROSS-REFERENCE TO RELATED APPLICATION

The present application claims priority from Japanese Patent Application No. 2020-077435 filed on Apr. 24, 2020, the entire contents of which are hereby incorporated by reference.

BACKGROUND

The technology relates to a steering angle detecting apparatus.

A steering angle sensor that measures a turning angle of a steering wheel includes two relative steering angle detectors. The two relative steering angle detectors each detect a relative steering angle. The steering angle sensor detects an absolute steering angle on the basis of a difference between the relative steering angles detected by the two relative steering angle detectors, and outputs a signal of the thus-detected absolute steering angle to each system. The relative steering angles detected by the two relative steering angle detectors have respective phases that are different from each other. For example, reference is made to Japanese Unexamined Patent Application Publication No. 2006-322794.

If one of such relative steering angle detectors malfunctions, it is difficult to detect the absolute steering angle and to output the signal that indicates the absolute steering angle accordingly. The malfunction of one of the relative steering angle detectors can consequently lead to discontinuation of a drive assist control system, such as a vehicle dynamics control (VDC), that utilizes the absolute steering angle to assist a driver's driving operation.

SUMMARY

An aspect of the technology provides a steering angle detecting apparatus that includes a steering angle sensor and a diagnostic unit. The steering angle sensor includes two relative steering angle detectors and an absolute steering angle processor. The two relative steering angle detectors are configured to detect a plurality of two relative steering angles. Each of the two relative steering angles is detected on the basis of a rotation of a steering shaft at respective phases that are different from each other. The absolute steering angle processor is configured to calculate absolute steering angles. Each of the absolute steering angles is calculated on the basis of a phase difference between the two relative steering angles detected by the two relative steering angle detectors. The diagnostic unit is configured to determine whether an angular signal indicating an absolute steering angle of the absolute steering angles is outputted from the absolute steering angle processor. The diagnostic unit includes an absolute steering angle storage, a relative steering angle output detector, and a diagnostic absolute steering angle processor. The absolute steering angle storage is configured to store a latest absolute steering angle among the absolute steering angles. The relative steering angle output detector is configured to, in a case where the angular signal indicating the absolute steering angle is determined as not being outputted from the absolute steering angle processor, determine which of the two relative steering angle detectors outputs one of the two relative steering angles. The diagnostic absolute steering angle processor is configured to, in a case where the one of the two relative steering angle detectors is determined as outputting the one of the two relative steering angles, update the latest absolute steering angle by adding the outputted one of the two relative steering angles to the latest absolute steering angle stored in the absolute steering angle storage.

An aspect of the technology provides a steering angle detecting apparatus that includes a steering angle sensor and circuitry. The steering angle sensor includes two detectors and a processor. The two detectors are configured to detect a plurality of two relative steering angles. Each of the two relative steering angles is detected on the basis of a rotation of a steering shaft at respective phases that are different from each other. The processor is configured to calculate absolute steering angles. Each of the absolute steering angles is calculated on the basis of a phase difference between the two relative steering angles detected by the two detectors. The circuitry is configured to determine whether an angular signal indicating an absolute steering angle of the absolute steering angles is outputted from the processor, store a latest absolute steering angle among the absolute steering angles, in a case where the angular signal indicating the absolute steering angle is determined as not being outputted from the processor, determine which of the two detectors outputs one of the two relative steering angles, and in a case where the one of the two detectors is determined as outputting the one of the two relative steering angles, update the latest absolute steering angle by adding the outputted one of the two relative steering angles to the stored latest absolute steering angle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

A malfunction of one of two relative steering angle detectors provided in a steering angle sensor can lead to immediate discontinuation of an output of a signal that indicates an absolute steering angle. In this case, it is difficult to measure a turning angle, or an actual steering angle, of a steering wheel and to assist a driver's driving operation by means of a drive assist control system consequently.

To address such concerns, two steering angle sensors may be used to construct a redundant system and thereby to allow the drive assist control to be continued through detecting the absolute steering angle by one of the steering angle sensors, even when the other of the steering angle sensors has caused a malfunction. Providing the two steering angle sensors, however, increases costs.

It is desirable to provide a steering angle detecting apparatus that makes it possible to reduce costs without constructing a redundant system by two steering angle sensors, and makes it possible to allow an absolute steering angle to be calculated for continuation of a drive assist even in a case where one of two relative steering angle detectors provided in a steering angle sensor has caused a malfunction.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

Figure 1A:
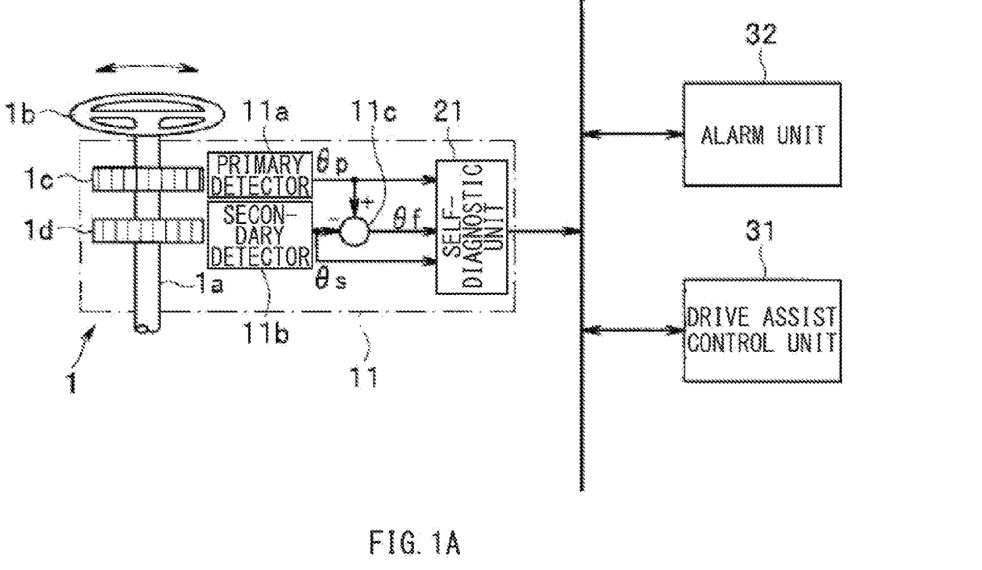
FIG. 1A is a diagram illustrating a configuration of a part of a drive assist control system having a steering angle detecting apparatus according to one example embodiment of the technology.

FIGS. 1A to 3 each illustrate a first example embodiment of the technology. FIG. 1A illustrates a part of an electric power steering (EPS) device 1. The EPS device 1 may include a steering shaft 1a having a base end and a leading end. The base end of the steering shaft 1a may be provided with a steering wheel 1b to be operated by a driver. The leading end of the steering shaft 1a may be provided with a steering gear box and an electric motor which are unillustrated. The steering gear box may have a rack-and-pinion steering gear mechanism.

The steering shaft 1a may have a primary gear 1c and a secondary gear 1d each having an annular shape. The steering shaft 1a may have shaft centers of the respective primary gear 1c and secondary gear 1d. The primary gear 1c and the secondary gear 1d each may serve as an element of a later-described steering angle sensor 11, and may be disposed at positions close to each other. The primary gear 1c and the secondary gear 1d each may also have an outer circumference having target teeth. In an example embodiment, the number of target teeth may be so set that the number of target teeth of the secondary gear 1d is less than the number of target teeth of the primary gear 1c by one tooth (N−1), where the number of target teeth of the primary gear 1c is N.

A primary detector 11a and a secondary detector 11b may be respectively provided close to the primary gear 1c and the secondary gear 1d. The primary detector 11a and the secondary detector 11b each may serve as an element of the steering angle sensor 11. The primary detector 11a and the secondary detector 11b may face the target teeth of the respective primary gear 1c and secondary gear 1d, and each may detect an angle of rotation of corresponding one of the primary gear 1c and the secondary gear 1d. In one embodiment, the primary detector 11a and the secondary detector 11b may serve as "relative steering angle detectors". The steering angle sensor 11 includes an absolute steering angle processor 11c and a self-diagnostic unit 21. In one embodiment, the self-diagnostic unit 21 may serve as a "diagnostic unit". The self-diagnostic unit 21 includes an absolute steering angle storage, a relative steering angle output detector, and a diagnostic absolute steering angle processor.

The self-diagnostic unit 21, a drive assist control unit 31, and an alarm unit 32 may be so coupled to each other as to allow for a communication freely and bidirectionally therebetween via an in-vehicle communication line such as a controller area network (CAN). In one embodiment, the drive assist control unit 31 may serve as a "drive assist processor". The self-diagnostic unit 21, the drive assist control unit 31, and the alarm unit 32 each may include an integrated circuit and its peripheral device. The integrated circuit may include, for example, a central processing unit (CPU), a random-access memory (RAM), a read-only memory (ROM), and a non-volatile storage. For example, the ROM may contain, in advance, a program to be executed by the CPU and pieces of fixed data including a table and a map.

The drive assist control unit 31 may assist a driving operation to be performed by the driver that drives a vehicle. Non-limiting examples of a control to be performed by the drive assist control unit 31 may include a vehicle dynamics control (VDC) that suppresses a side skid of the vehicle to achieve traveling stability of the vehicle. The alarm unit 32 may alert the driver visually or auditorily. The alarm unit 32 may alert the driver visually through a device such as a warning light or a monitor. The alarm unit 32 may alert the driver auditorily through a device such as a speaker.

Figure 1B:
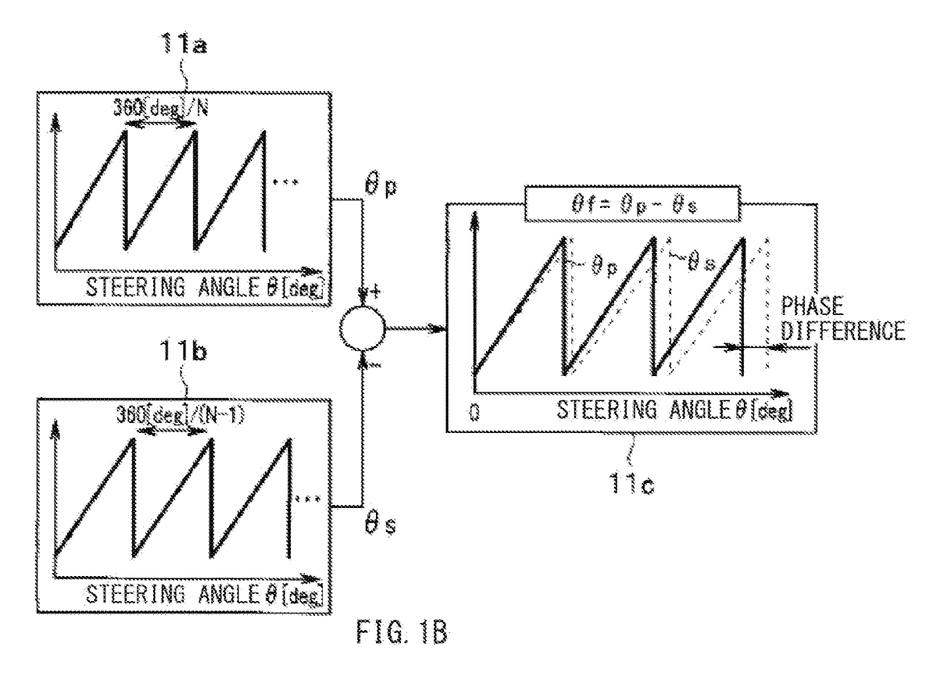
FIG. 1B is an explanatory diagram illustrating an example of calculating an absolute steering angle on the basis of a phase difference between two relative steering angles, according to one example embodiment.

The primary gear 1c and the secondary gear 1d of the steering angle sensor 11 may rotate integrally in accordance with the rotation of the steering shaft 1a. The primary detector 11a and the secondary detector 11b each may detect, magnetically or optically, the passage of the target teeth provided on corresponding one of the primary gear 1c and the secondary gear 1d. The primary detector 11a and the secondary detector 11b each may shape a waveform obtained by the detection (for example, a sinusoidal output signal) into a predetermined waveform as illustrated in FIG. 1B, and each may output the predetermined waveform as an angular signal that indicates corresponding one of a primary steering angle θp and a secondary steering angle θs. The primary steering angle θp and the secondary steering angle θs each may be a relative steering angle.

In an example embodiment, the number of target teeth provided on the secondary gear 1d may be set to the number defined by (N−1) where the number of target teeth provided on the primary gear 1c is N. Accordingly, the primary detector 11a may detect the primary steering angle θp at a phase of 360 [deg]/N, whereas the secondary detector 11b may detect the secondary steering angle θs at a phase of 360 [deg]/(N−1).

The absolute steering angle processor 11c calculates absolute steering angles θf on the basis of a phase difference between the primary steering angle θp and the secondary steering angle θs that are each indicated by the angular signal outputted from corresponding one of the primary detector 11a and the secondary detector 11b. The absolute steering angles θf may be based on, as a reference, a neutral point of the steering shaft 1a.

The self-diagnostic unit 21 may receive the angular signals that indicate the respective primary steering angle θp and secondary steering angle θs each serving as the relative steering angle. The self-diagnostic unit 21 may also receive an angular signal that indicates the absolute steering angle θf. The self-diagnostic unit 21 monitors whether the angular signal indicating the absolute steering angle θf of the absolute steering angles θf is outputted from the absolute steering angle processor 11c. In a case where the self-diagnostic unit 21 determines that the angular signal indicating the absolute steering angle θf is outputted from the absolute steering angle processor 11c, the self-diagnostic unit 21 may determine that the steering angle sensor 11 is normal and output the angular signal indicating the absolute steering angle θf as it is to, for example, the drive assist control unit 31.

In a case where the self-diagnostic unit 21 determines that the angular signal indicating the absolute steering angle θf is not outputted from the absolute steering angle processor 11c and where either one of the primary steering angle θp and the secondary steering angle θs is detected, the self-diagnostic unit 21 calculates the absolute steering angle θf on the basis of detected one of the primary steering angle θp and the secondary steering angle θs.

Figure 2:
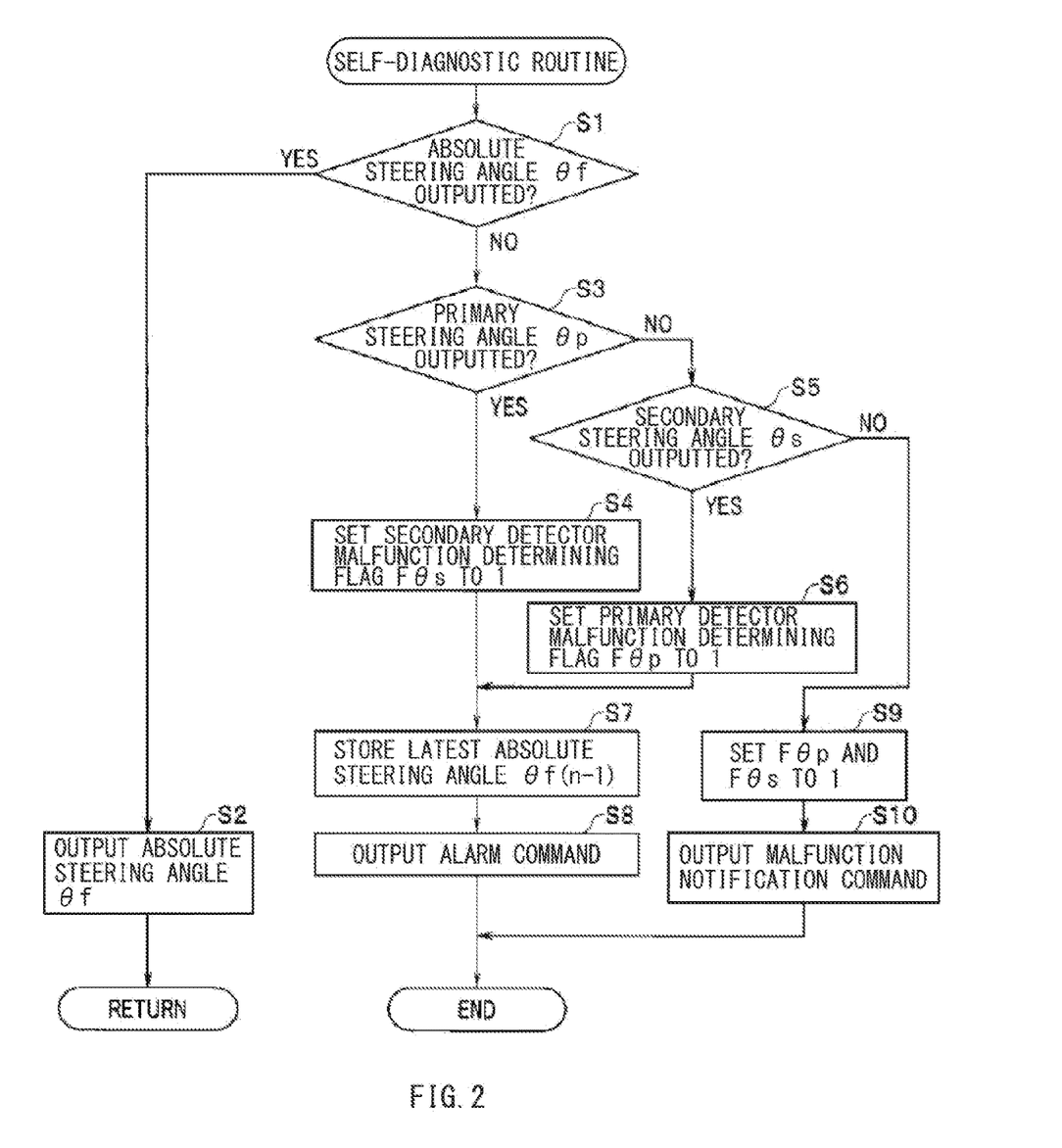
FIG. 2 is a flowchart illustrating an example of a self-diagnostic routine according to one example embodiment.
Figure 3:
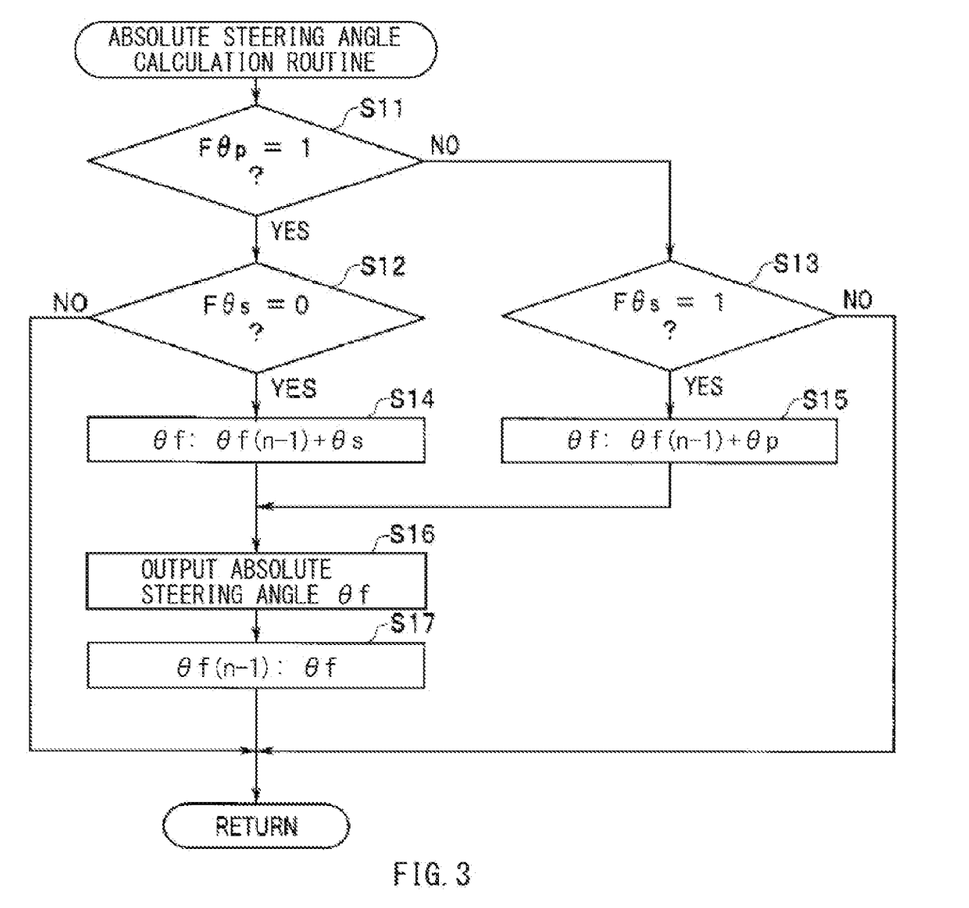
FIG. 3 is a flowchart illustrating an example of an absolute steering angle calculation routine according to one example embodiment.

A self-diagnostic process and an absolute steering angle calculation process executed by the self-diagnostic unit 21 as described above may be respectively performed in accordance with a self-diagnostic routine illustrated in FIG. 2 and an absolute steering angle calculation routine illustrated in FIG. 3.

In step S1, the self-diagnostic routine illustrated in FIG. 2 may first involve determining whether the angular signal indicating the absolute steering angle θf of the absolute steering angles θf is outputted from the absolute steering angle processor 11c. If the angular signal indicating the absolute steering angle θf is determined as being outputted (step S1: YES), the steering angle sensor 11 may be determined as being normal and the routine may proceed to step S2. In step S2, the angular signal indicating the absolute steering angle θf may be outputted, following which the self-diagnostic routine may end.

If the angular signal indicating the absolute steering angle θf is determined as not being outputted (step S1: NO), the routine may proceed to step S3 to determine, in steps S3 and S5, which of the primary detector 11a and the secondary detector 11b is malfunctioning, on the basis of which of the angular signal indicating the primary steering angle θp and the angular signal indicating the secondary steering angle θs is outputted.

If the angular signal indicating the primary steering angle θp is determined as being outputted (step S3: YES), the secondary detector 11b may be determined as being malfunctioning, and the routine may proceed to step S4 from step S3. In step S4, a secondary detector malfunction determining flag Fθs may be set (Fθs: 1), following which the routine may proceed to step S7.

If the angular signal indicating the secondary steering angle θs is determined as being outputted (step S5: YES), the primary detector 11a may be determined as being malfunctioning, and the routine may proceed to step S6 from step S5. In step S6, a primary detector malfunction determining flag Fθp may be set (Fθp: 1), following which the routine may proceed to step S7. Note that an initial value of each of the primary detector malfunction determining flag Fθp and the secondary detector malfunction determining flag Fθs may be 0 (zero). In one embodiment, the processes performed in steps S3 to S6 may serve as a process to be performed by the relative steering angle output detector.

The routine may proceed to step S7 from step S4 or from step S6. In step S7, a latest absolute steering angle θf(n−1) calculated by the absolute steering angle processor 11c may be stored in a storage such as the RAM. Note that the reference sign (n−1) denotes an immediately preceding value. In other words, upon the execution of the first self-diagnostic routine after the occurrence of the malfunction, the latest absolute steering angle θf(n−1) to be stored in step S7 may be the absolute steering angle θf indicated by the angular signal that is outputted by the process of step S2 performed immediately prior thereto. In one embodiment, the storage that stores the latest absolute steering angle θf(n−1) among the absolute steering angles θf in step S7 may serve as the "absolute steering angle storage". In some embodiments, the self-diagnostic unit 21 may cause the storage to store the latest absolute steering angle θf(n−1) to update the latest absolute steering angle θf(n−1), regardless of the presence of the malfunction of any of the primary detector 11a and the secondary detector 11b.

Thereafter, in step S8, an alarm command may be outputted, following which the self-diagnostic routine may end. In a case where the alarm unit 32 receives the alarm command from the self-diagnostic unit 21, the alarm unit 32 may drive the device such as the warning light, the monitor, or the speaker to notify the driver of the malfunction of the steering angle sensor 11. In a case where the alarm command is outputted, an upper limit of a vehicle speed may be limited.

If both the angular signal indicating the primary steering angle θp and the angular signal indicating the secondary steering angle θs are determined as not being outputted (step S3: NO and step S5: NO), the steering angle sensor 11 may be determined as being malfunctioning, and the routine may proceed to step S9. In step S9, both the primary detector malfunction determining flag Fθp and the secondary detector malfunction determining flag Fθs may be set (Fθp and Fθs: 1), following which the routine may proceed to step S10. In step S10, a malfunction notification command may be outputted, following which the self-diagnostic routine may end.

In a case where the alarm unit 32 receives the malfunction notification command from the self-diagnostic unit 21, the alarm unit 32 may drive the device such as the warning light, the monitor, or the speaker to notify the driver of the malfunction of the steering angle sensor 11 and of discontinuation of a system related to a drive assist control, i.e., of execution of a fail-safe mode. Accordingly, a steering operation may be no longer power assisted by the EPS device 1 and the driver may perform the steering operation mechanically.

Thereafter, the self-diagnostic unit 21 may execute the absolute steering angle calculation routine illustrated in FIG. 3. In step S11, the absolute steering angle calculation routine may first involve determining whether the primary detector 11a is malfunctioning by referring to a value of the primary detector malfunction determining flag Fθp. If the primary detector 11a is determined as being malfunctioning, i.e., Fθp=1 (step S11: YES), the routine may proceed to step S12. If the primary detector 11a is determined as being normal, i.e., Fθp=0 (step S11: NO), the routine may proceed to step S13.

In step S12, whether the secondary detector 11b is malfunctioning may be determined by referring to a value of the secondary detector malfunction determining flag Fθs. If the secondary detector 11b is determined as not being malfunctioning, i.e., Fθs=0 (step S12: YES), this means that the primary detector 11a is malfunctioning but the secondary detector 11b is normal. In this case, the routine may proceed to step S14. If the secondary detector 11b is determined as being malfunctioning, i.e., Fθs=1 (step S12: NO), this means that both the primary detector 11a and the secondary detector 11b are malfunctioning. In this case, the absolute steering angle calculation routine may end.

The routine may proceed to step S13 from step S11. In step S13, the self-diagnostic unit 21 may refer to a value of the secondary detector malfunction determining flag Fθs. If the secondary detector 11b is determined as being malfunctioning, i.e., Fθs=1 (step S13: YES), this means that the secondary detector 11b is malfunctioning but the primary detector 11a is normal. In this case, the routine may proceed to step S15. If the secondary detector 11b is determined as not being malfunctioning, i.e., Fθs=0 (step S13: NO), this means that both the primary detector 11a and the secondary detector 11b are normal. In this case, the absolute steering angle calculation routine may end.

The routine may proceed to step S14 from step S12. In step S14, the latest absolute steering angle θf upon the occurrence of the malfunction may be calculated (θf: θf(n−1)+θs) through reading the latest absolute steering angle θf(n−1) and adding the secondary steering angle θs to the latest absolute steering angle θf(n−1). Thereafter, the routine may proceed to step S16. The routine may proceed to step S15 from step S13. In step S15, the latest absolute steering angle θf upon the occurrence of the malfunction may be calculated (θf: θf(n−1)+θp) through reading the latest absolute steering angle θf(n−1) and adding the primary steering angle θp to the latest absolute steering angle θf(n−1). Thereafter, the routine may proceed to step S16. In one embodiment, the processes performed in steps S14 and S15 may serve as a process to be performed by the diagnostic absolute steering angle processor.

In step S16, the angular signal indicating the absolute steering angle θf calculated in step S14 or S15 may be outputted, following which the routine may proceed to step S17. In step S17, the latest absolute steering angle θf(n−1) stored in the storage may be updated with the thus-outputted absolute steering angle θf (θf(n−1): θf), following which the absolute steering angle calculation routine may end.

It is to be noted that a direction of rotation of the steering shaft 1a is switched in accordance with a turning increase operation and a turning back operation of the steering wheel 1b. The absolute steering angle θf increases by the turning increase operation and decreases by the turning back operation. In addition, a hysteresis occurs in the steering shaft 1a upon the switching of the direction of rotation of the steering shaft 1a.

The hysteresis appears as a lag in a sinusoidal waveform detected by the normal primary detector 11a or the normal secondary detector 11b. Accordingly, detecting the lag makes it possible to determine the direction of rotation (the turning increase operation or the turning back operation) that is based on the primary steering angle θp detected by the normal primary detector or the secondary steering angle θs 11a detected by the normal secondary detector 11b. A positive sign (+) may be added to the primary steering angle θp detected by the normal primary detector 11a or the secondary steering angle θs detected by the normal secondary detector 11b for a turning increase direction of the steering wheel 1b, and a negative sign (−) may be added to the primary steering angle θp detected by the normal primary detector 11a or the secondary steering angle θs detected by the normal secondary detector 11b for a turning back direction of the steering wheel 1b. Further, for example, a positive sign (+) may be added to the absolute steering angle θf for a left turning direction with reference to the neutral point, and a negative sign (−) may be added to the absolute steering angle θf for a right turning direction with reference to the neutral point.

The absolute steering angle θf may be read by, for example, the drive assist control unit 31. The drive assist control unit 31 may utilize the absolute steering angle θf to assist the driving operation to be performed by the driver that drives the vehicle.

According to an example embodiment described above, in a case where one of the primary detector 11a and the secondary detector 11b provided in the steering angle sensor 11 has caused a malfunction, the absolute steering angle θf is calculated by adding, to the immediately preceding absolute steering angle θf as a reference, the relative steering angle, i.e., the primary steering angle θp or the secondary steering angle θs, detected by the other of the primary detector 11a and the secondary detector 11b which is normal. Hence, it is possible to allow a drive assist to be continued. Further, the configuration according to an example embodiment described above eliminates the necessity of constructing a redundant system by two steering angle sensors. Hence, it possible to reduce costs.

Figure 4:
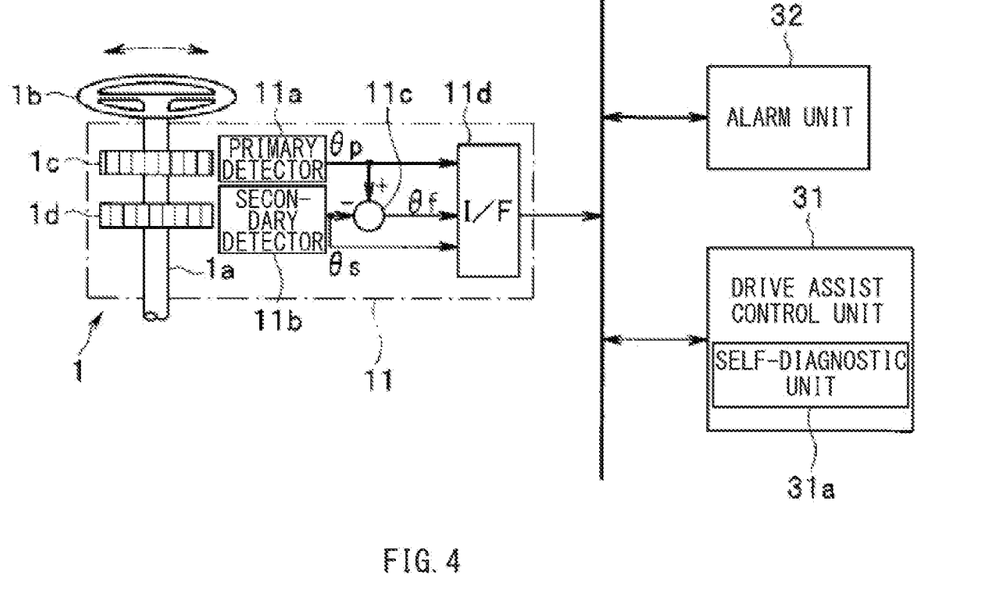
FIG. 4 is a diagram illustrating a configuration of a part of the drive assist control system having the steering angle detecting apparatus according to one example embodiment of the technology.

FIG. 4 illustrates a second example embodiment of the technology. In the first example embodiment described above, the self-diagnostic unit 21 provided in the steering angle sensor 11 monitors the occurrence of the malfunction of the primary detector 11a and the secondary detector 11b, and calculates the absolute steering angle θf on the basis of the primary steering angle θp or the secondary steering angle θs obtained from normal one of the primary detector 11a and the secondary detector 11b in a case where the malfunction is detected.

In the second example embodiment, a self-diagnostic unit 31a provided inherently in the drive assist control unit 31 may monitor the occurrence of the malfunction of the primary detector 11a and the secondary detector 11b provided in the steering angle sensor 11. In one embodiment, the drive assist control unit 31 may serve as the "drive assist processor".

The drive assist control unit 31 may execute various controls including, for example, the VDC control, an anti-lock brake system (ABS) control, an active lane keep (ALK) control, and a lane departure prevention (LDP) control. The drive assist control unit 31 may utilize the absolute steering angle θf detected by the steering angle sensor 11 to assist the driving operation to be performed by the driver that drives the vehicle through the various controls exemplified above.

The VDC control may suppress the side skid of the vehicle to achieve the traveling stability of the vehicle. The ABS control may reduce a brake pressure to be applied to a wheel that is likely to be locked to prevent an occurrence of lock. The ALK control may assist a steering operation in order to cause the vehicle to travel along the middle of a traveling lane. The LDP control may intervene in the steering operation to suppress the lane departure of the vehicle, in a case where the vehicle is determined as being likely to depart from the traveling lane.

The steering angle sensor 11 according to the second example embodiment may include an interface circuit (I/F) 11d. The interface circuit 11d may output the angular signals indicating the respective primary steering angle θp, secondary steering angle θs, and absolute steering angle θf detected by means of the primary detector 11a and the secondary detector 11b to the drive assist control unit 31 via the in-vehicle communication line.

In a case where the self-diagnostic unit 31a of the drive assist control unit 31 has detected the malfunction of any of the primary detector 11a and the secondary detector 11b provided in the steering angle sensor 11, the self-diagnostic unit 31a may add, to the latest absolute steering angle θf(n−1), the primary steering angle θp or the secondary steering angle θs obtained from normal one of the primary detector 11a and the secondary detector 11b to calculate the latest absolute steering angle θf corresponding to the occurrence of the malfunction, as with the first example embodiment described above.

The drive assist control unit 31 may utilize the latest absolute steering angle θf calculated by the self-diagnostic unit 31a to execute the various controls exemplified above, in a case where the self-diagnostic unit 31a has detected the malfunction of any of the primary detector 11a and the secondary detector 11b.

The self-diagnostic routine and the absolute steering angle calculation routine to be executed by the self-diagnostic unit 31a may be the same in processes as those of the first example embodiment described above and will not be described in detail accordingly.

According to the second example embodiment described above, the self-diagnostic unit 31a provided in the drive assist control unit 31 may monitor the angular signals indicating the respective primary steering angle θp, secondary steering angle θs, and absolute steering angle θf outputted from the steering angle sensor 11. Thus, it is possible to simplify a configuration of component parts of the steering angle sensor 11. Hence, it is possible to apply the configuration according to the second example embodiment to a steering angle sensor that has no self-diagnostic function.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The self-diagnostic unit 21 and the self-diagnostic unit 31a respectively illustrated in FIGS. 1 and 4 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the self-diagnostic unit 21 and the self-diagnostic unit 31a. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the self-diagnostic unit 21 and the self-diagnostic unit 31a respectively illustrated in FIGS. 1 and 4.

The invention claimed is:

1. A steering angle detecting apparatus comprising:
a steering angle sensor comprising two relative steering angle detectors and an absolute steering angle processor, the two relative steering angle detectors being configured to detect a plurality of two relative steering angles, each of the two relative steering angles being detected on a basis of a rotation of a steering shaft at respective phases that are different from each other, the absolute steering angle processor being configured to calculate absolute steering angles, each of the absolute steering angles being calculated on a basis of a phase difference between the two relative steering angles detected by the two relative steering angle detectors; and
a diagnostic unit configured to determine whether an angular signal indicating an absolute steering angle of the absolute steering angles is outputted from the absolute steering angle processor, wherein
the diagnostic unit comprises:
an absolute steering angle storage configured to store a latest absolute steering angle among the absolute steering angles,
a relative steering angle output detector configured to, in response to the angular signal indicating the absolute steering angle being determined as not being outputted from the absolute steering angle processor, determine which of the two relative steering angle detectors outputs one of the two relative steering angles, and
a diagnostic absolute steering angle processor configured to, in response to the one of the two relative steering angle detectors being determined as outputting the one of the two relative steering angles, update the latest absolute steering angle by adding the outputted one of the two relative steering angles to the latest absolute steering angle stored in the absolute steering angle storage.

2. The steering angle detecting apparatus according to claim 1, wherein the diagnostic unit is provided in the steering angle sensor.

3. The steering angle detecting apparatus according to claim 1, wherein the diagnostic unit is provided in a drive assist processor configured to assist, on a basis of the absolute steering angle, a driving operation to be performed by a driver.

4. A steering angle detecting apparatus comprising:
a steering angle sensor comprising two detectors and a processor, the two detectors being configured to detect a plurality of two relative steering angles, each of the two relative steering angles being detected on a basis of a rotation of a steering shaft at respective phases that are different from each other, the processor being configured to calculate absolute steering angles, each of the absolute steering angles being calculated on a basis of a phase difference between the two relative steering angles detected by the two detectors; and
circuitry configured to
determine whether an angular signal indicating an absolute steering angle of the absolute steering angles is outputted from the processor,
store a latest absolute steering angle among the absolute steering angles,
in response to the angular signal indicating the absolute steering angle being determined as not being outputted from the processor, determine which of the two detectors outputs one of the two relative steering angles, and
in response to the one of the two detectors being determined as outputting the one of the two relative steering angles, update the latest absolute steering angle by adding the outputted one of the two relative steering angles to the stored latest absolute steering angle.

* * * * *